(12) United States Patent
Kim et al.

(10) Patent No.: US 9,426,440 B2
(45) Date of Patent: Aug. 23, 2016

(54) THUMBNAIL IMAGE DISPLAY APPARATUS AND METHOD FOR OPERATING THE SAME

(75) Inventors: Kinam Kim, Seoul (KR); Yongki Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 449 days.

(21) Appl. No.: 12/897,951

(22) Filed: Oct. 5, 2010

(65) Prior Publication Data

US 2011/0083140 A1     Apr. 7, 2011

(30) Foreign Application Priority Data

Oct. 7, 2009   (KR) .................. 10-2009-0095293

(51) Int. Cl.
| | |
|---|---|
| *H04N 7/16* | (2011.01) |
| *H04N 5/445* | (2011.01) |
| *H04N 9/82* | (2006.01) |
| *H04N 1/00* | (2006.01) |
| *H04N 5/46* | (2006.01) |
| *H04N 21/475* | (2011.01) |
| *H04N 21/482* | (2011.01) |

(52) U.S. Cl.
CPC ......... *H04N 9/8205* (2013.01); *H04N 1/00442* (2013.01); *H04N 5/46* (2013.01); *H04N 21/4753* (2013.01); *H04N 21/4821* (2013.01); *H04N 9/8227* (2013.01)

(58) Field of Classification Search
CPC . H04N 21/4753; H04N 21/4821; H04N 5/46; H04N 9/8205; H04N 9/8227; H04N 9/822; H04N 1/00442
See application file for complete search history.

(56) References Cited

U.S. PATENT DOCUMENTS

| | | | |
|---|---|---|---|
| 6,405,371 B1 * | 6/2002 | Oosterhout et al. | ............ 725/39 |
| 8,156,436 B2 * | 4/2012 | Matsutani | ......... G06F 17/30749 |
| | | | 715/727 |
| 2003/0115607 A1 * | 6/2003 | Morioka et al. | ................ 725/61 |
| 2005/0010947 A1 * | 1/2005 | Ellis | ............................... 725/38 |
| 2007/0192791 A1 * | 8/2007 | Sullivan et al. | .................. 725/38 |
| 2008/0320523 A1 * | 12/2008 | Morris et al. | .................... 725/47 |
| 2009/0064222 A1 * | 3/2009 | Dawson et al. | ................. 725/38 |
| 2010/0082567 A1 * | 4/2010 | Rosenblatt et al. | ........... 707/705 |

* cited by examiner

*Primary Examiner* — Rong Le

(74) *Attorney, Agent, or Firm* — KED & Associates LLP

(57) ABSTRACT

An image display apparatus and a method for operating the same are disclosed. The method includes receiving an input signal, extracting images from the input signal, generating thumbnail images by converting formats of the extracted images, and transmitting at least one of the thumbnail images to a connected external device.

23 Claims, 7 Drawing Sheets

THUMBNAIL IMAGE DISPLAY APPARATUS AND METHOD FOR OPERATING THE SAME

CROSS-REFERENCE TO RELATED APPLICATION(S)

This application claims the benefit of Korean Application No. 10-2009-0095293, filed on Oct. 7, 2009 in the Korean Intellectual Property Office, the disclosure of which is incorporated herein by reference.

BACKGROUND

1. Field

The present invention relates to an image display apparatus and a method for operating the same, and more particularly, to an image display apparatus and a method for operating the same, which generate a thumbnail image and transmit the thumbnail image to an external device.

2. Background

An image display apparatus has a function of displaying images to a user. The image display apparatus can display a broadcast program selected by the user on a display from among broadcast programs transmitted from broadcasting stations. The recent trend in broadcasting is a worldwide shift from analog broadcasting to digital broadcasting.

As it transmits digital audio and video signals, digital broadcasting offers many advantages over analog broadcasting, such as robustness against noise, less data loss, ease of error correction, and the ability to provide high-definition, clear images. Digital broadcasting also allows interactive viewer services.

However, as broadcast channels increase in number to meet various user demands, it becomes more difficult for viewers to determine what programs they are watching as they switch through channels. Therefore, much time is taken to select a channel. Moreover, the viewers may not easily identify channels that they watched and thus may view the channels again even though for a short time.

In addition, the image display apparatus is connected to a plurality of external devices so that it may be used in various manners according to user tastes.

BRIEF DESCRIPTION OF THE DRAWINGS

The embodiments will be described in detail with reference to the following drawings in which like reference numerals refer to like elements wherein.

DETAILED DESCRIPTION

Therefore, the present invention has been made in view of the above problems, and it is an object of the present invention to provide an image display apparatus and a method for operating the same, which generate a thumbnail image based on an input signal and not only provide the thumbnail image to a user but also transmit the thumbnail image to an external device so that the user can use the thumbnail image fin various ways.

In accordance with an aspect of the present invention, the above and other objects can be accomplished by the provision of a method for operating an image display apparatus including receiving an input signal, extracting images from the input signal, generating thumbnail images by converting formats of the extracted images, and transmitting at least one of the thumbnail images to a connected external device.

In accordance with another aspect of the present invention, there is provided an image display apparatus including a display, a channel browsing processor for generating thumbnail images based on an input signal, an external signal input/output unit connected to an external device, and a controller for controlling transmission of at least one of the thumbnail images to the external device.

Exemplary embodiments of the present invention will be described below with reference to the attached drawings.

The terms "module" and "unit" used to signify components are used herein to help the understanding of the components and thus they should not be considered as having specific meanings or roles. Accordingly, the terms "module" and "unit" may be used interchangeably.

Figure 1:
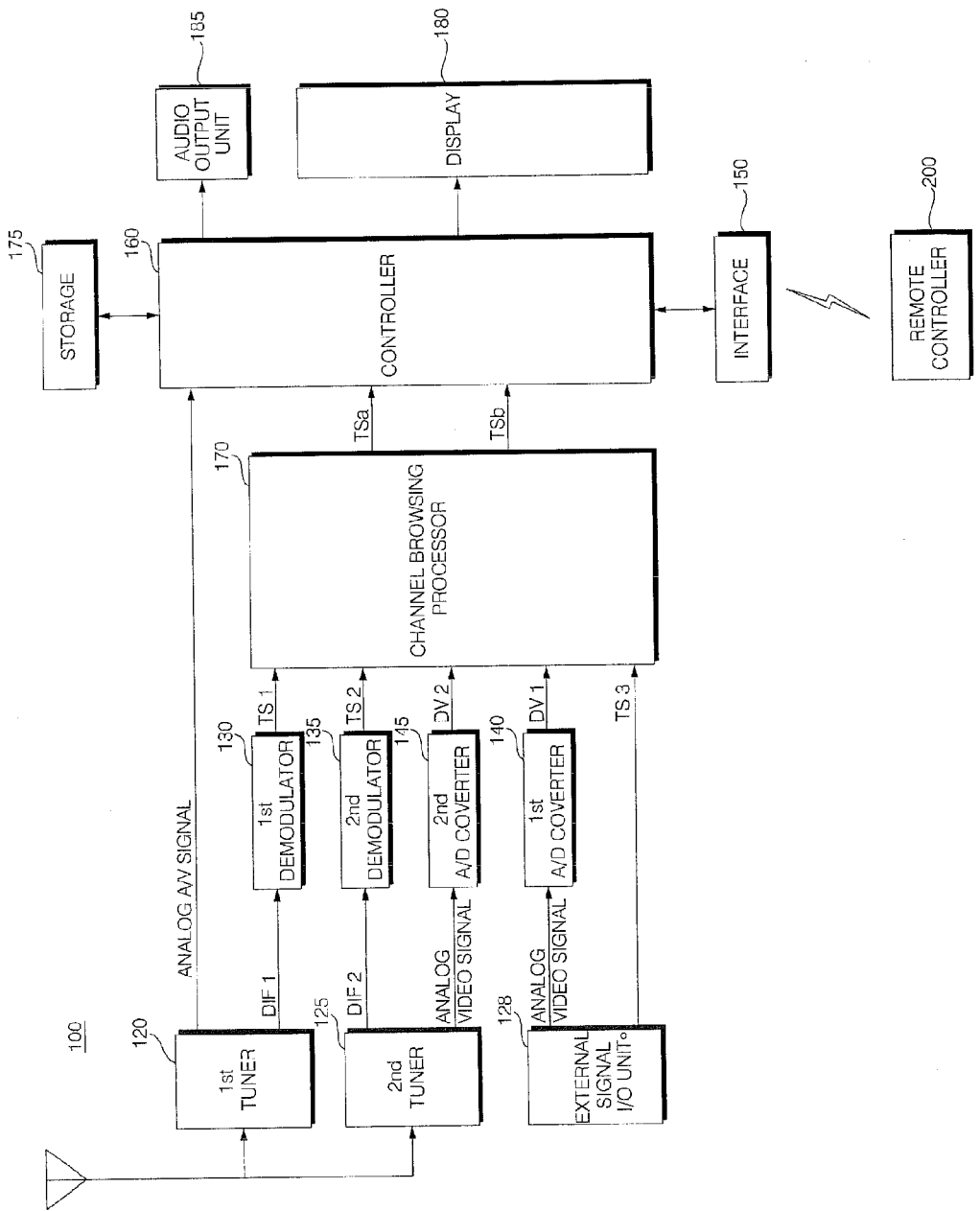
FIG. 1 is a block diagram of an image display system according to an exemplary embodiment of the present invention.

FIG. 1 is a block diagram of an image display apparatus according to an exemplary embodiment of the present invention.

Referring to FIG. 1, an image display apparatus 100 according to an exemplary embodiment of the present invention includes a first tuner 120, a second tuner 125, an external signal Input/Output (I/O) unit 128, a first demodulator 130, a second demodulator 135, a first Analog-to-Digital (A/D) converter 140, a second A/D converter 145, an interface 150, a controller 160, a channel browsing processor 170, a storage 175, a display 180, and an audio output unit 185.

The first tuner 120 selects a Radio Frequency (RF) broadcast signal corresponding to a channel selected by a user from among a plurality of RF broadcast signals received through an antenna and downconverts the selected RF broadcast signal into a digital Intermediate Frequency (IF) signal or an analog baseband Audio/Video (A/V) signal. More specifically, if the selected RF broadcast signal is a digital broadcast signal, the first tuner 120 downconverts the selected RF broadcast signal into a digital IF signal DIF 1. On the other hand, if the selected RF broadcast signal is an analog broadcast signal, the first tuner 120 downconverts the selected RF broadcast signal into an analog baseband A/V signal, CVBS 1/SIF. That is, the first tuner 120 may be a hybrid tuner capable of processing not only digital broadcast signals but also analog broadcast signals. The analog baseband A/V signal CVBS 1/SIF may be directly input to the controller 160.

The first tuner 120 may be capable of receiving RF broadcast signals from an Advanced Television Systems Committee (ATSC) single-carrier system or from a Digital Video Broadcasting (DVB) multi-carrier system, as described later.

The second tuner 125, like the first tuner 120, selects the RF broadcast signal corresponding to the channel selected by the user from among the plurality of RF broadcast signals received through the antenna and downconverts the selected RF broadcast signal into a second digital IF signal DIF 2 or an analog baseband A/V signal.

In addition, the second tuner 125 may sequentially or periodically select a number of RF broadcast signals corresponding to all broadcast channels previously stored in the image display apparatus 100 by a channel add function from a plurality of RF signals received through the antenna, and may downconvert the selected RF broadcast signals into IF signals or baseband A/V signals. In an exemplary embodiment, one or more video frames acquired from each of the previously-stored channels may be displayed on at least a part of the display 180 as a thumbnail image. Thus, it is possible to receive the RF broadcast signals corresponding to all of the previously-stored channels sequentially or periodically.

For example, the first tuner 120 may downconvert a main RF broadcast signal selected by the user into an IF signal or a baseband A/V signal, and the second tuner 125 may sequentially or periodically select all RF broadcast signals or all other RF broadcast signals (i.e., sub-RF broadcast signals) except for the main RF broadcast signal and downconvert the selected RF broadcast signals into IF signals or baseband A/V signals.

The first demodulator 130 receives the first digital IF signal DIF 1 from the first tuner 120 and demodulates the first digital IF signal DIF 1.

For example, if the first digital IF signal DIF 1 is an ATSC signal, the first demodulator 130 may perform 8-Vestigal SideBand (VSB) demodulation on the first digital IF signal DIF 1. The first demodulator 130 may also perform channel decoding. For channel decoding, the first demodulator 130 may include a Trellis decoder (not shown), a de-interleaver (not shown) and a Reed-Solomon decoder (not shown) so as to perform Trellis decoding, de-interleaving and Reed-Solomon decoding.

For example, if the first digital IF signal DIF 1 is a DVB signal, the first demodulator 130 performs Coded Orthogonal Frequency Division Multiple Access (COFDMA) demodulation on the first digital IF signal DIF 1. The first demodulator 130 may also perform channel decoding. For channel decoding, the first demodulator 130 may include a convolution decoder (not shown), a de-interleaver (not shown), and a Reed-Solomon decoder (not shown) so as to perform convolution decoding, de-interleaving, and Reed-Solomon decoding.

The external signal I/O unit 128 transmits signals to and receives signals from an external device. For transmission and reception of signals, the external signal I/O unit 128 may include an A/V I/O unit (not shown) and a wireless communication module (not shown).

The external signal I/O unit 128 is connected to an external device such as a Digital Versatile Disc (DVD) player, a Blu-ray player, a game console, a camcorder, or a computer (e.g., a laptop computer). Then, the external signal I/O unit 128 externally receives video, audio, and/or data signals from the external device and transmits the received input signals to the controller 160. In addition, the external signal I/O unit 128 may output video, audio, and data signals processed by the controller 160 or the channel browsing processor 170 to the external device.

In order to receive or transmit A/V signals from or to the external device, the A/V I/O unit of the external signal I/O unit 128 may include an Ethernet port, a Universal Serial Bus (USB) port, a Composite Video Banking Sync (CVBS) port, a Component port, a Super-video (S-video) (analog) port, a Digital Visual Interface (DVI) port, a High-Definition Multi-media interface (HDMI) port, a Red-Green-Blue (RGB) port, a D-sub port, an Institute of Electrical and Electronics Engineers (IEEE)-1394 port, a Sony/Philips Digital Interconnect Format (S/PDIF) port, and a LiquidHD port.

Analog signals received through the CVBS port and the S-video port may be converted into digital signals by the first A/D converter 140. Digital signals received through the Ethernet port, the USB port, the component port, the DVI port, the HDMI port, the RGB port, the D-sub port, the IEEE-1394 port, the S/PDIF port and the LiquidHD port may be directly input to the channel browsing processor 170 without N/D conversion.

The wireless communication module of the external signal I/O unit 128 may wirelessly access the Internet. For the wireless Internet access, the wireless communication module may use Wireless Local Area Network (WLAN) (i.e., Wi-Fi), Wireless Broadband (WiBro), World Interoperability for Microwave Access (WiMax), and High Speed Downlink Packet Access (HSDPA).

In addition, the wireless communication module may perform short-range wireless communication with other electronic devices. For the short-range wireless communication, the wireless communication module may use Bluetooth, Radio-Frequency IDentification (RFID), Infrared Data Association (IrDA), Ultra WideBand (UWB), and ZigBee.

The external signal I/O unit 128 may be connected to various set-top boxes through at least one of the Ethernet port, the USB port, the CVBS port, the Component port, the S-video port, the DVI port, the HDMI port, the RGB port, the D-sub port, the IEEE-1394 port, the S/PDIF port, and the LiquidHD port and may thus receive data from or transmit data to the various set-top boxes. For example, when connected to an Internet Protocol Television (IPTV) set-top box, the external signal I/O unit 128 may transmit video, audio and data signals processed by the IPTV set-top box to the controller 160 and may transmit various signals received from the controller 160 to the IPTV set-top box.

The term 'IPTV' as used herein covers a broad range of services, depending on transmission networks, such as ADSL-TV, VDSL-TV, FTTH-TV, TV over DSL, Video over DSL, TV over IP (TVIP), Broadband TV (BTV), and Internet TV and full-browsing TV, which are capable of providing Internet access services.

If the external signal I/O unit 128 outputs a digital signal, particularly a third stream signal TS 3, the channel browsing processor 170 processes the third stream signal TS 3. The third stream signal TS 3 may be a signal in which a video signal, an audio signal and a data signal are multiplexed. For example, the third stream signal TS 3 may be an MPEG-2 Transport Stream (TS) in which an MPEG-2 video signal and a Dolby AC-3 audio signal are multiplexed.

If the external signal I/O unit 128 outputs an analog video signal, the analog video signal needs to be converted into a digital signal by the first A/D converter 140.

The first A/D converter 140 converts an input analog signal into a digital signal. If the input analog signal is a video signal, the analog video signal may be converted into a first digital video signal DV 1 through sampling and quantization. The digital signal may be a signal that has yet to be encoded. The channel browsing processor 170 receives the digital video signal DV 1 and processes it, which will be described later in detail.

The first demodulator 130 may perform demodulation and channel decoding on the first digital IF signal DIF 1 received from the first tuner 120, thereby obtaining a first stream signal TS 1. The first stream signal TS 1 may be a signal in which a video signal, an audio signal and a data signal are multiplexed. For example, the first stream signal TS 1 may be an MPEG-2 TS in which an MPEG-2 video signal and a Dolby AC-3 audio signal are multiplexed. An MPEG-2 TS may include a 4-byte header and a 184-byte payload.

The first stream signal TS 1 is input to the controller 160 and is thus subjected to demultiplexing and signal processing in the controller 160. In an exemplary embodiment of the present invention, the first stream signal TS 1 is first input to the channel browsing processor 170 and then processed in the channel browsing processor 170, for channel browsing. The channel browsing will be described later.

In order to properly handle not only ATSC signals but also DVB signals, the first demodulator 130 may include an ATSC demodulator and a DVB demodulator.

The second demodulator 135 receives the second digital IF signal DIF 2 from the second tuner 125 and demodulates the second digital IF signal DIF 2, thereby generating a second stream signal TS 2. The operation of the second demodulator 135 is almost the same as the operation of the first demodulator 130.

An analog baseband video signal CVBS 2 output from the second tuner 125 needs to be converted into a digital signal by the second A/D converter 145.

The second A/D converter 145 converts a received analog signal into a digital signal. If the received analog signal is a video signal, the ND converter 140 performs sampling and quantization on the analog signal, thereby obtaining a second digital video signal DV 2. The second digital video signal DV 2 may be a signal that has yet to be encoded. The second digital video signal DV 2 is provided to the channel browsing processor 170, for processing.

The interface 150 transmits a signal received from the user to the controller 160 or transmits a signal received from the controller 160 to the user. For example, the interface 150 may receive various user input signals such as a power-on/off signal, a channel selection signal, and a screen setting signal from a remote controller 200 or may transmit a signal received from the controller 160 to the remote controller 200, according to various communication schemes such as RF communication and IR communication.

The controller 160 may demultiplex an input stream signal into a number of signals and process the demultiplexed signals so that the processed signals can be output as A/V data. The controller 160 may provide overall control to the image display apparatus 100.

The controller 160 may include a demultiplexer (not shown), a video processor (not shown), an audio processor (not shown), and a user input processor (not shown).

The controller 160 may demultiplex an input stream signal, for example an MPEG-2 TS, into a video signal, an audio signal and a data signal.

Thereafter, the controller 160 may process the video signal. For example, if the video signal is an encoded signal, the controller 160 may decode the video signal. More specifically, if the video signal is an MPEG-2 encoded signal, the controller 160 may decode the video signal by performing MPEG-2 decoding. On the other hand, if the video signal is an H.264-encoded DMB or DVB-handheld (DVB-H) signal, the controller 160 may decode the video signal by performing H.264 decoding.

In addition, the controller 160 may adjust the brightness, tint and color of the video signal.

The video signal processed by the controller 160 is displayed on the display 180. Alternatively or additionally, the video signal processed by the controller 160 may be output to an external output port connected to an external output device.

The controller 160 may process the audio signal obtained by demultiplexing the input stream signal. For example, if the audio signal is an encoded signal, the controller 160 may decode the audio signal. More specifically, if the audio signal is an MPEG-2 encoded signal, the controller 160 may decode the audio signal by performing MPEG-2 decoding. On the other hand, if the audio signal is an MPEG-4 Bit Sliced Arithmetic Coding (BSAC)-encoded terrestrial DMB signal, the controller 160 may decode the audio signal by performing MPEG-4 decoding. If the audio signal is an MPEG-2 Advanced Audio Coding (AAC)-encoded DMB or DVB-H signal, the controller 180 may decode the audio signal by AAC decoding.

In addition, the controller 160 may adjust the bass, treble or volume of the audio signal.

The audio signal processed by the controller 160 is output to the audio output unit 185, for example, a speaker. Alternatively or additionally, the audio signal processed by the controller 160 may be output to an external output port connected to an external output device.

The controller 160 may process the data signal obtained by demultiplexing the input stream signal. For example, if the data signal is an encoded signal such as an Electronic Program Guide (EPG), which provides broadcast information (e.g. start time and end time) about programs played on each channel, the controller 160 may decode the data signal. Examples of an EPG include ATSC-Program and System Information Protocol (ATSC-PSIP) information and DVB-Service Information (DVB-SI). ATSC-PSIP information or DVB-SI may be included in the header of a TS, i.e., the 4-byte header of an MPEG-2 TS.

The controller 160 may perform On-Screen Display (OSD) processing. More specifically, the controller 160 may generate an OSD signal for displaying various information on the display 180 as graphic or text data based on a user input signal received from the remote controller 200 and at least one of a processed video signal or a processed data signal. The OSD signal may be input to the display 180 along with the processed video and data signals.

The OSD signal may include various data such as a User-Interface (UI), various menu screens, widgets, and icons for the image display apparatus 100.

The channel browsing processor 170 enables channel browsing of at least one of a plurality of broadcast signals corresponding to a plurality of received channels, various input image signals received from the external signal I/O unit 128, or both. More specifically, the channel browsing processor 170 may receive the first or second stream signal TS 1 or TS 2 from the first or second demodulator 130 or 135, the third stream signal TS 3 from the external signal I/O unit 128, the first digital signal DV 1 from the first ND converter 140, or the second digital signal DV 2 from the second A/D converter 145, demultiplex the first, second or third stream signal TS 1, TS 2 or TS 3, and extract some of the frames of a video signal obtained through demultiplexing. Thereafter, the channel browsing processor 170 may generate a new TS signal, i.e., a sub-stream signal TSa, by multiplexing a video signal including the extracted video frames. For example, the sub-stream signal TSa or a main-stream signal TSb may be an MPEG-2 TS. The channel browsing processor 170 may output the main-stream signal TSb, which corresponds to a main video signal to be displayed in a main region of the display 180, without any processing. On the other hand, the channel browsing processor 170 may perform channel browsing on a sub-video signal, which is to be displayed in a sub-region of the display 180, thereby obtaining the sub-stream signal TSa.

In this exemplary embodiment, the channel browsing processor 170 may extract some of the video frames of each of a plurality of broadcast signals received through a plurality of channels and re-encode the extracted video frames into a TS, thereby displaying a list of the channels on the display 180. Since the extracted video frames are displayed on the display 180 as thumbnail images, the user can readily identify the contents of broadcast programs received through the plurality of channels.

Likewise, the channel browsing processor 170 may extract some of the video frames of each of various external input signals received from the external signal I/O unit 128 and re-encode the extracted video frames into a stream, thereby displaying an external input list on the display 180. In this manner, a list of a plurality of external input video signals received from a plurality of external input devices may be displayed on the display 180 as thumbnail images. Therefore, the user can readily identify the external input signals received from the external input devices based on the external input list.

Also, the channel browsing processor 170 may extract some of the video frames of each of a plurality of broadcast signals received through a plurality of channels and some of the video frames of each of various external input signals received from the external signal I/O unit 128 and re-encode the extracted video frames into TSs, thereby displaying a channel list and an external input list on the display 180. Since the extracted video frames are displayed on the display 180 as thumbnail images, the user can readily identify the contents of broadcast programs received through the plurality of channels and the external input signals received from the external input devices.

The structure and operation of the channel browsing processor 170 will be described later in further detail with reference to FIG. 2.

The storage 175 may store various programs by which the controller 160 processes and controls signals, and may also store processed video, audio and data signals.

The storage 175 may temporarily store a video, audio or data signal received from the external signal I/O unit 128.

The storage 175 may store broadcast channels identified through the channel add function.

The storage 175 may include, for example, at least one of a flash memory-type storage medium, a hard disk-type storage medium, a multimedia card micro-type storage medium, a card-type memory (e.g. a Secure Digital (SD) or eXtreme Digital (XD) memory), a Random Access Memory (RAM), or a Read-Only Memory (ROM).

The image display apparatus 100 may display a file (such as a video file, a still image file, a music file, or a text file) stored in the storage 175 to the user.

The display 180 may convert a processed video signal, a processed data signal, and an OSD signal received from the controller 160 or a video signal and a data signal received from the external signal I/O unit 128 into RGB signals, thereby generating driving signals. The display 180 may be various types of displays such as a Plasma Display Panel (PDP), a Liquid Crystal Display (LCD), an Organic Light-Emitting Diode (OLED) display, a flexible display, and a three-dimensional (3D) display. The display 180 may also be a touch screen that can be used not only as an output device but also as an input device.

The audio output unit 185 may receive a processed audio signal (e.g., a stereo signal or a 5.1-channel signal) from the controller 160 and output the received audio signal as sound. The audio output unit 185 may employ various speaker configurations.

The remote controller 200 transmits user input to the interface 150. For the transmission of user input, the remote controller 200 may use various communication techniques such as Bluetooth, RF, IR, UWB and ZigBee.

In addition, the remote controller 200 may receive a video signal, an audio signal and a data signal from the interface 150 and output the received signals.

The remote controller 200 may be a pointing device.

The image display apparatus 100 may be a fixed digital broadcast receiver capable of receiving at least one of ATSC (8-VSB) broadcast programs, DVB-T (COFDM) broadcast programs, or ISDB-T (BST-OFDM) broadcast programs, or may be a mobile digital broadcast receiver capable of receiving at least one of terrestrial DMB broadcast programs, satellite DMB broadcast programs, ATSC-M/H broadcast programs, DVB-H (COFDM) broadcast programs, or Media Forward Link Only (MediaFLO) broadcast programs. Alternatively or additionally, the image display apparatus 100 may be a digital broadcast receiver capable of receiving cable broadcast programs, satellite broadcast programs or IPTV programs.

Examples of the image display apparatus 100 include a TV receiver, a mobile phone, a smart phone, a laptop computer, a digital broadcast receiver, a Personal Digital Assistant (PDA) and a Portable Multimedia Player (PMP).

Figure 2:
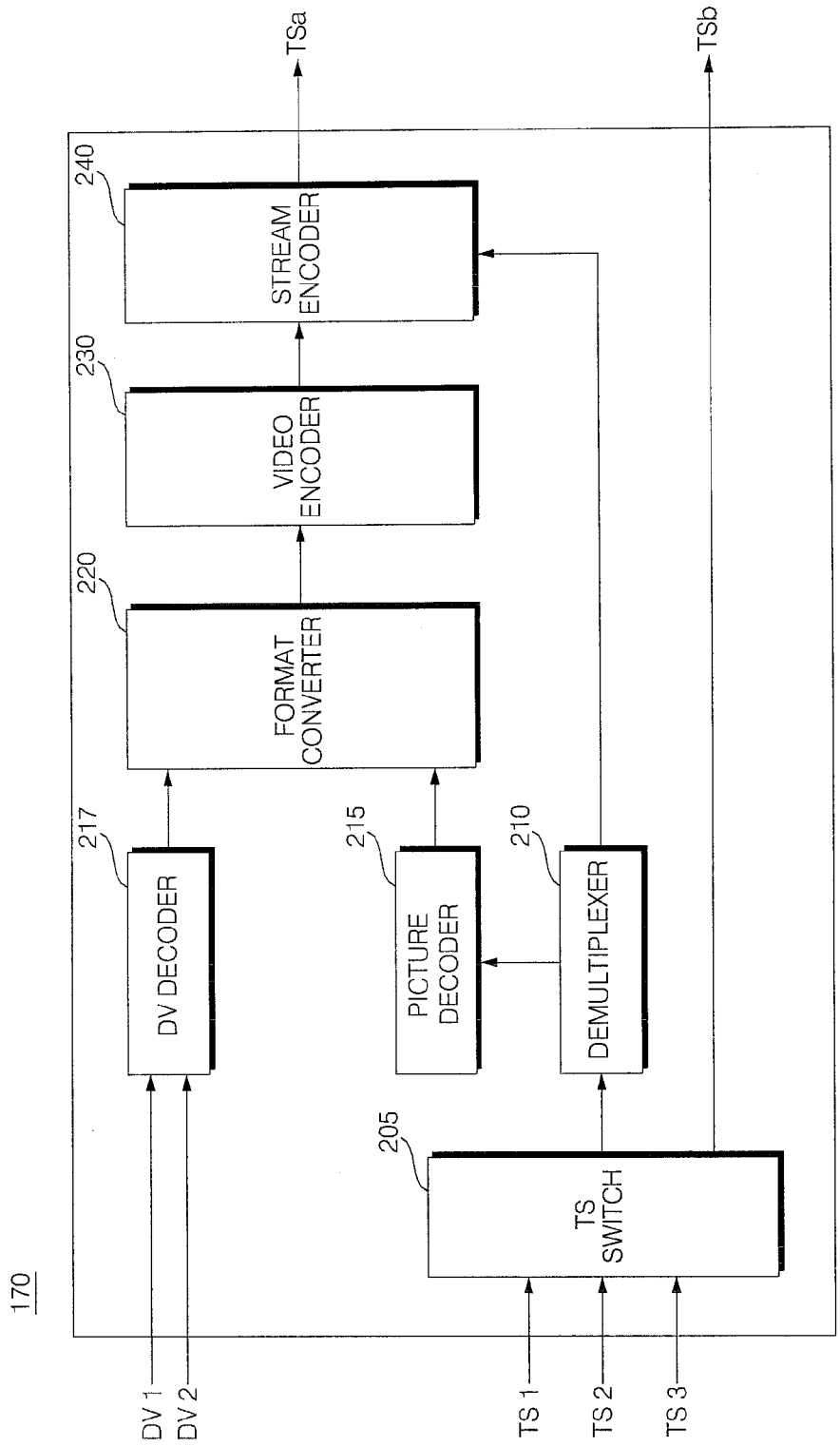
FIG. 2 is a block diagram of a channel browsing processor illustrated in FIG. 1.

FIG. 2 is a block diagram of the channel browsing processor 170 illustrated in FIG. 1.

Referring to FIG. 2, the channel browsing processor 170 includes a TS switch 205, a demultiplexer 210, a picture decoder 215, a DV decoder 217, a format converter 220, an image encoder 230, and a stream encoder 240.

The TS switch 205 selects one of the first, second and third stream signals TS 1, TS 2 and TS 3, outputs the selected stream signal as the main-stream signal TSb without processing, and transmits the other stream signals to the demultiplexer 210 as sub-stream signals. The main-stream signal, which corresponds to a main video signal, may be displayed on almost the entirety of the display 180. The sub-stream signals, which correspond to sub-video signals, may be displayed only on certain parts of the display 180.

In this manner, a channel list, an external input list, or both may be displayed in a compact-view mode in a certain area on the display 180.

The demultiplexer 210 may demultiplex the first, second or third stream signal TS 1, TS 2 or TS 2 into a video signal, an audio signal and a data signal, output the video signal to the picture decoder 215, and output the audio signal and the data signal to the stream encoder 240 in order for the stream encoder 240 to generate a new stream signal.

The picture decoder 215 decodes at least some of the frames of the received video signal by performing MPEG-2 decoding, MPEG-4 decoding or H.264 decoding. The decoded frames may be still images or moving pictures. For example, the picture decoder 215 may decode an Intra-coded (I) frame or some section of the received video signal.

The DV decoder 217 receives the first or second digital signal DV 1 or DV 2 from the first or second ND converter 140 or 145 and acquires a digital image from the first or second digital signal DV 1 or DV 2.

The format converter 220 converts the format of a video signal received from the picture decoder 215 or the DV decoder 217. For example, the format converter 220 may change the size (or resolution) of the input video signal. The input video signal is scaled depending on the number of thumbnail images in a thumbnail list displayed on the display 180, such that the thumbnail images can be displayed at an appropriate size.

The format converter 220 may scale the input video signal to a different size according to whether the input video signal is to be displayed in a compact-view mode or in a full-view mode. The size of thumbnail images displayed in the full-view mode may be greater than the size of thumbnail images displayed in the compact-view mode. A channel list and/or an external input list may be displayed on the display 180 either in the compact-view mode or in the full-view mode.

The image encoder 230 may encode the video signal received from the format converter 220 by performing JPEG coding or MPEG-2 coding. Still images or moving pictures encoded by the image encoder 230 may be displayed on the display 180 as thumbnail images.

The stream encoder 230 may re-encode or multiplex an encoded image signal received from the image encoder 230 and the audio and data signals obtained by the demultiplexing performed in the demultiplexer 210 into a stream, for example, an MPEG-2 TS. The re-encoded or multiplexed stream may be an MPEG-2 TS.

In this exemplary embodiment, the channel browsing processor 170 extracts some of the video frames of each of a plurality of broadcast signals and a plurality of external input signals and re-encodes the extracted video frames. Then, the re-encoded images may be displayed on the display 180 as thumbnail images in response to a user input requesting 'Channel List View' or 'External Input List View'. In this manner, the user can readily identify the contents of broadcast programs received from various channels or external input signals provided by various external input devices.

Figure 3:
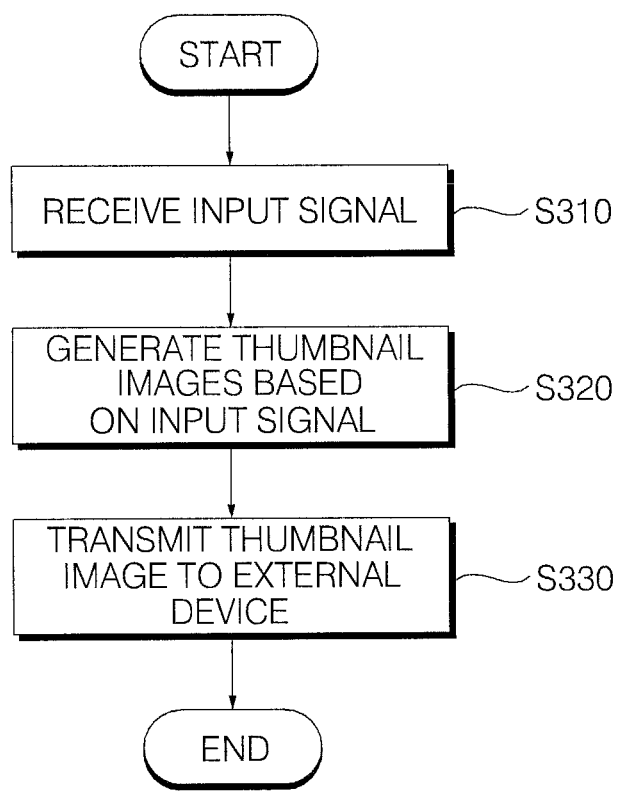
FIG. 3 is a flowchart illustrating a method for operating the image display apparatus according to an exemplary embodiment of the present invention.

FIG. 3 is a flowchart illustrating a method for operating the image display apparatus according to an exemplary embodiment of the present invention.

Referring to FIG. 3, an input signal is received in step S310. The input signal may include at least one of a broadcast signal received on at least one channel or an external input signal received from an external input device.

In step S320, the channel browsing processor 170 generates a plurality of thumbnail images based on the input signal.

The channel browsing processor 170 may generate thumbnail images periodically or at a predetermined time. Also, the channel browsing processor 170 may update at least one of the thumbnail images to a latest thumbnail image.

The thumbnail generation in step S320 may involve extraction of images from the input signal and generation of thumbnail images by converting the formats of the extracted images.

As described before with reference to FIG. 2, the channel browsing processor 170 may include a decoder for extracting images from an input signal, a format converter for generating thumbnail images by converting the formats of the extracted images, and an encoder for encoding the thumbnail images.

In an exemplary embodiment, the decoder may include the picture decoder 215 and the DV decoder 217. The picture decoder 215 may acquire still images or moving pictures by decoding some video frames of a video signal obtained by demultiplexing a stream signal. The DV decoder 217 may acquire a digital image from the input first or second digital stream signal DV 1 or DV 2.

The format converter 220 may generate thumbnail images by converting the formats of the extracted images, such as size, resolution, etc.

The method for operating the image display apparatus may further include displaying at least one of the thumbnail images on the display 180. A thumbnail display time period may coincide with a thumbnail transmission time period, at least partially.

As described before, the external signal I/O unit 128 is connected to an external device, such as a DVD player, a Blu-ray player, a game console, a camcorder, a computer (e.g., a laptop computer), an electronic album, or an electronic frame, wirelessly or by cable. The external signal I/O unit 128 may include the A/V I/O unit (not shown) and the wireless communication module (not shown).

The external signal I/O unit 128 may transmit a video signal, an audio signal and a data signal processed by the controller 160 or the channel browsing processor 170 to the external device.

The A/V I/O unit of the external signal I/O unit 128 may include an Ethernet port, a USB port, a CVBS port, a Component port, an S-video (analog) port, a DVI port, an HDMI port, an RGB port, a D-sub port, an IEEE-1394 port, etc.

The wireless communication module of the external signal I/O unit 128 may wirelessly access the Internet using WLAN, WiBro, WiMax, etc. In addition, the wireless communication module may conduct short-range wireless communication with other electronic devices using, for example, Bluetooth, RFID, IR communication, etc.

Accordingly, at least one of the thumbnail images may be transmitted to the external device through the external signal I/O unit 128.

Because an external device such as an electronic album, an electronic frame, or a camcorder is capable of displaying a still image or a video, the external device may display a thumbnail image received from the image display apparatus 100. Thus, the user can use thumbnail images of his or her content for various purposes such as displaying the thumbnail images in an electronic album or as a background image on a computer screen.

In another example, the image display apparatus 100 may extract thumbnail images of presentation materials such as an MS PowerPoint presentation from a PC input. The extracted thumbnail images may be transmitted to a plurality of audience members without a complex manipulation, wirelessly by WiFi, WLAN, Bluetooth, etc. or by cable.

As another exemplary embodiment, the connected external device is further detected. In the detection step, the type of the connected external device may be identified, that is, it may be determined whether the connected external device is an electronic album, a camcorder, a storage device, a portable terminal, etc. In addition, it is determined what type of files the connected external device uses.

The thumbnail image may be re-converted according to the properties of the external device. For example, if the external device connected to the image display apparatus 100 over a wireless or wired network is an electronic album, the thumbnail image may be converted into a photo format used by the electronic album.

The method for operating the image display apparatus may further include a step for storing the thumbnail images.

As a thumbnail image is transmitted to an external device through an external interface immediately or at a predetermined time, the thumbnail image can be shared without using an external storage device and used for various purposes in the external device.

Also, the method for operating the image display apparatus may further include a step for displaying information about the transmission state of the thumbnail image. The transmission state of the thumbnail image indicates transmission in progress or transmission completion. Therefore, the user can readily identify a thumbnail image being transmitted and a thumbnail image completely transmitted. The transmission state may be indicated in text form. Alternatively or additionally, the transmission state may be indicated using a graphic object, for example, an icon, so that the user may readily identify the transmission state.

In the transmission step, at least one of the thumbnail images transmitted to the external device may be stored in the external device. In this case, the stored state of the thumbnail image may be displayed on the display 180.

In general, an image display apparatus stores thumbnail images in a volatile memory, such as RAM, thereby making the thumbnail images unavailable to another device. Moreover, a user is not allowed to use the thumbnail images for other purposes.

Since the thumbnail images are deleted when the image display apparatus is turned off or at every predetermined interval, the user has difficulty in identifying or using thumbnail images that he or she previously viewed.

In this context, the present invention enables thumbnail images generated based on broadcast signals received on broadcast channels or based on external inputs to be stored in an external storage device such as a Universal Serial Bus (USB) memory or an HDD, so that the user may use the thumbnail images for various purposes at any time in a desired device.

Furthermore, since the thumbnail images are retained in the external storage device, the user can use the thumbnail images semi-permanently unless he or she deletes them.

Meanwhile, if the external storage device is a portable device such as a USB memory, the external storage device may be connected to another image display apparatus so as to use the stored thumbnail images.

Figure 4:
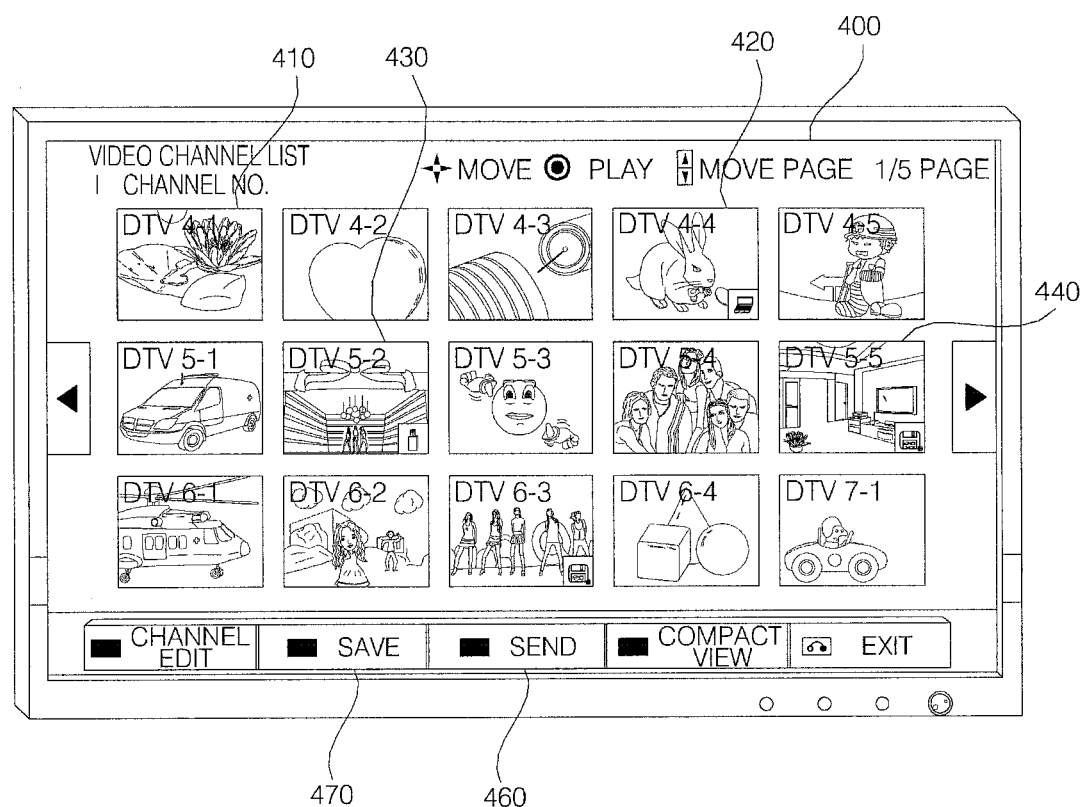
FIGS. 4 and 5 are views referred to for describing the method for operating the image display apparatus illustrated in FIG. 3.
Figure 5:
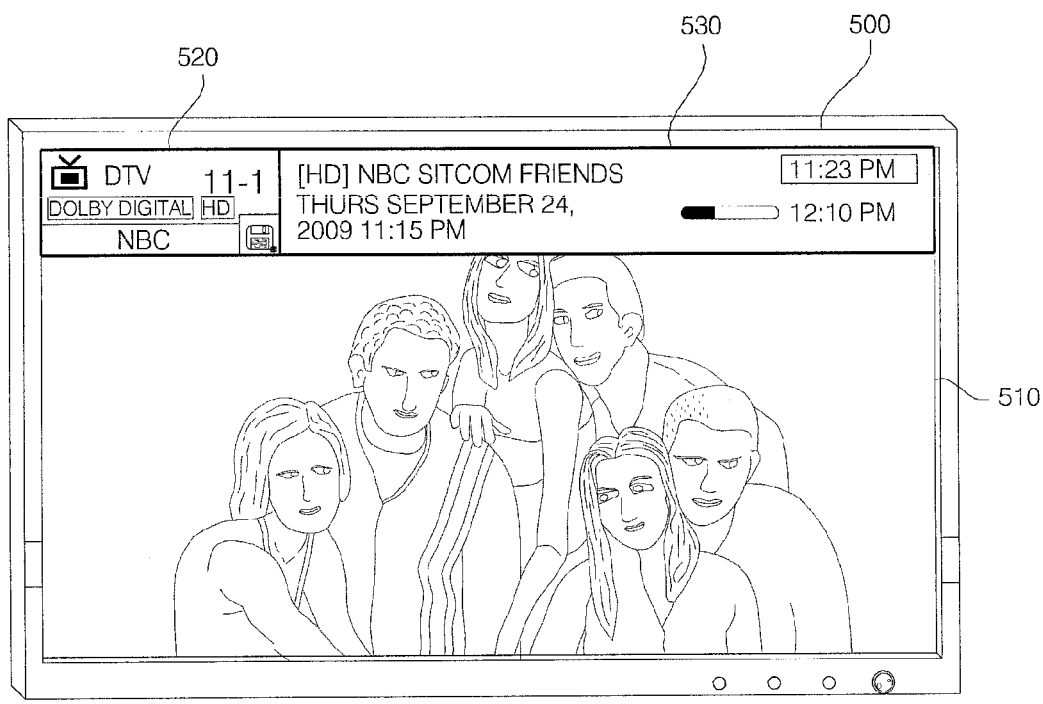

FIGS. 4 and 5 are views referred to for describing the method for operating the image display apparatus illustrated in FIG. 3.

Referring to FIG. 4, when a channel list display command is received, a 'Video Channel List' is displayed in a full-view mode on a screen. That is, a plurality of thumbnail images 410 may be displayed on the entirety of the display 180.

While the thumbnail images 410 are shown as displayed on the entirety of the display 180 in the full-view mode, to which the present invention is not limited, the thumbnail images 410 may be displayed on a part of the display 180 in a compact-view mode.

Since a thumbnail list 400 including the thumbnail images 410 is displayed on the display 180 in this manner, the user can readily identify the contents of broadcast programs played on channels or the contents of an external input device.

The thumbnail images 410 may be still images or moving pictures. The thumbnail images 410 may be images that are currently received or previously stored. In addition, the thumbnail images 410 may be processed and extracted by the afore-described channel browsing processor 170.

The thumbnail list 400 may further include an edit menu. The edit menu may include menu items 'Channel Edit', 'Compact View' for displaying an image of a selected channel on a part of the display 180, while displaying thumbnail images in another part of the display 180, and 'Exit' for moving from the 'Video Channel List' to another menu, as illustrated in a lower part of the display 180.

While not shown, the edit menu may further include other menu items, 'Previous' for displaying a thumbnail list previous to the thumbnail list 400, and 'Next' for displaying a thumbnail list following the thumbnail list 400.

If an edit command is received while the thumbnail list 400 is displayed on the display 180, a broadcast channel corresponding to a selected thumbnail image may be saved as a favorite, set as deleted, or set as locked.

If a next screen display command or a previous screen display command is received while the thumbnail list 400 is displayed on the display 180, the next or previous screen may be displayed in a dragging, scrolling or rotation fashion.

The edit menu may further include menu items, 'Send' 460 for transmitting a thumbnail image to an external device and 'Save' 470 for storing a thumbnail image in an external device.

All or part of the thumbnail images 410 may be transmitted to an external device. As illustrated in FIG. 4, a thumbnail image 420, which is transmitted to a laptop computer, may be displayed along with an icon or text information representing the laptop computer. In case of thumbnail images being stored in external devices, for example, a thumbnail image 430 being stored in a USB memory and a thumbnail image 440 being stored in another external storage device are displayed along with various graphics or text information representing the USB memory and the external storage device. Therefore, the user can readily identify the transmission state and stored state of the thumbnail images.

In the method for operating the image display apparatus according to the present invention, thumbnail images may be selectively transmitted based on a preset condition, or thumbnail images corresponding to reserved content may be extracted from an input signal and transmitted.

Specifically, when the user presets conditions regarding content type, genre, writer, casting, running time, etc., thumbnail images may be filtered based on the preset conditions and thus selectively transmitted.

In addition, thumbnail images corresponding to reserved content may be automatically transmitted. For broadcast signals, an EPG is preferably used. A viewer can readily identify broadcast programs that will air about one week later as well as broadcast programs airing that day and broadcasting stations that are airing or will air the broadcast programs, using the EPG. Once the viewer selects or focuses on the title of a desired program, the viewer can obtain more detailed program information than a simple program list. According to the present invention, a broadcast program may be recorded by reservation and a thumbnail image corresponding to the broadcast program may be stored and transmitted, by selecting or focusing on the title of the broadcast program in an EPG screen. The EPG provides information about broadcast programs, in terms of subject matter, start time, running time, genre, casting, etc.

FIG. 5 illustrates a screen displaying currently viewed content, for which a thumbnail image is transmitted to and stored in an external device according to an exemplary embodiment of the present invention.

Referring to FIG. 5, currently viewed content 510 is displayed on a display 500, an object 520 is displayed on a part of the display 500 to indicate transmission and stored states, and an object 530 is displayed to provide information about a program. While the object indicating the transmission and stored states is shown as being displayed separately from the object indicating the program information, they may be displayed in one window.

If a thumbnail image being transmitted or stored is for reserved content, the transmission or stored state of the thumbnail image may be displayed on a part of the display for a predetermined time, without distracting a user from a content that the user is watching.

In an exemplary embodiment, if the thumbnail image is for restricted content, the thumbnail image may be transmitted only if a preset authentication condition is satisfied. For example, the thumbnail transmission is enabled when the image display apparatus 100 is connected to a registered portable terminal or external device, a user is authorized, or a predetermined operation is performed for user authentication.

In the case where the thumbnail image is for restricted content requiring user authentication, an object regarding the user authentication may be further displayed on the display and thus the thumbnail image may be transmitted only after the user is authenticated. For instance, if user authentication, such as password input, is required, a password input window or any other menu object for user authentication may be displayed on the display.

Figure 6:
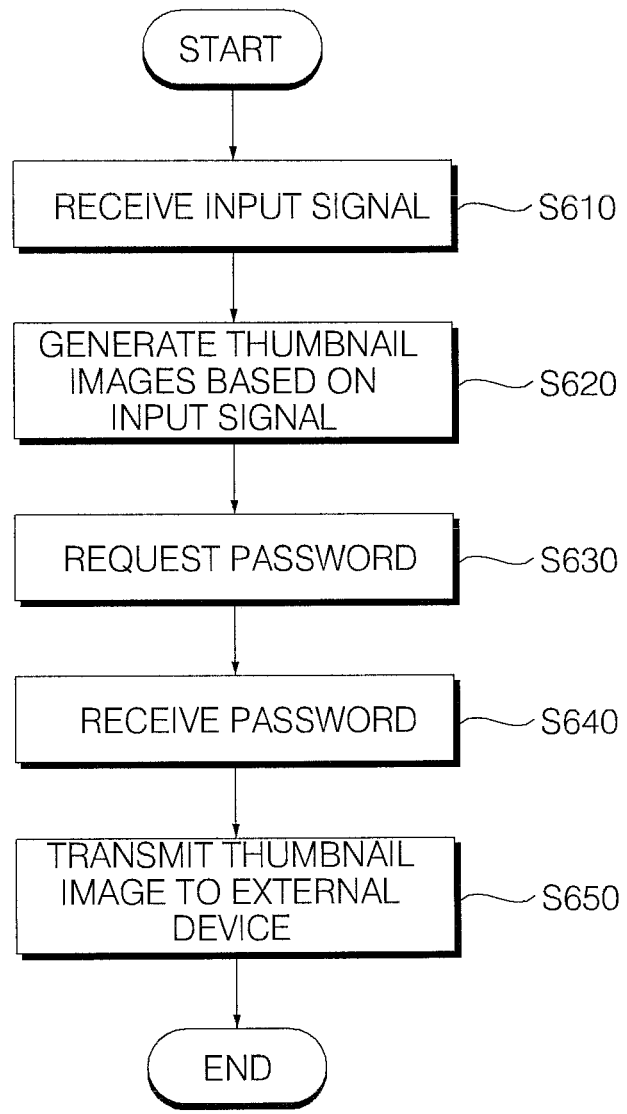
FIG. 6 is a flowchart illustrating a method for operating the image display apparatus according to another exemplary embodiment of the present invention.

FIG. 6 is a flowchart illustrating a method for operating the image display apparatus, when a password is required for user authentication according to another exemplary embodiment of the present invention.

Referring to FIG. 6, an input signal is received in step S610. The channel browsing processor 170 generates a plurality of thumbnail images based on the input signal in step S620.

If a thumbnail image is for restricted content, a password input object is displayed on the display in step S630. If a received password is valid in step S640, the thumbnail image is transmitted in step S650.

The above-described operation may be performed for a channel or external input that has been viewing-restricted or access-restricted based on its rating or through a locking function of the image display apparatus. If the user intends to transmit or store a thumbnail image corresponding to the restricted channel or external input, he or she is prompted to enter a password. The thumbnail image may be transmitted or stored only if the password is valid.

Figure 7A:
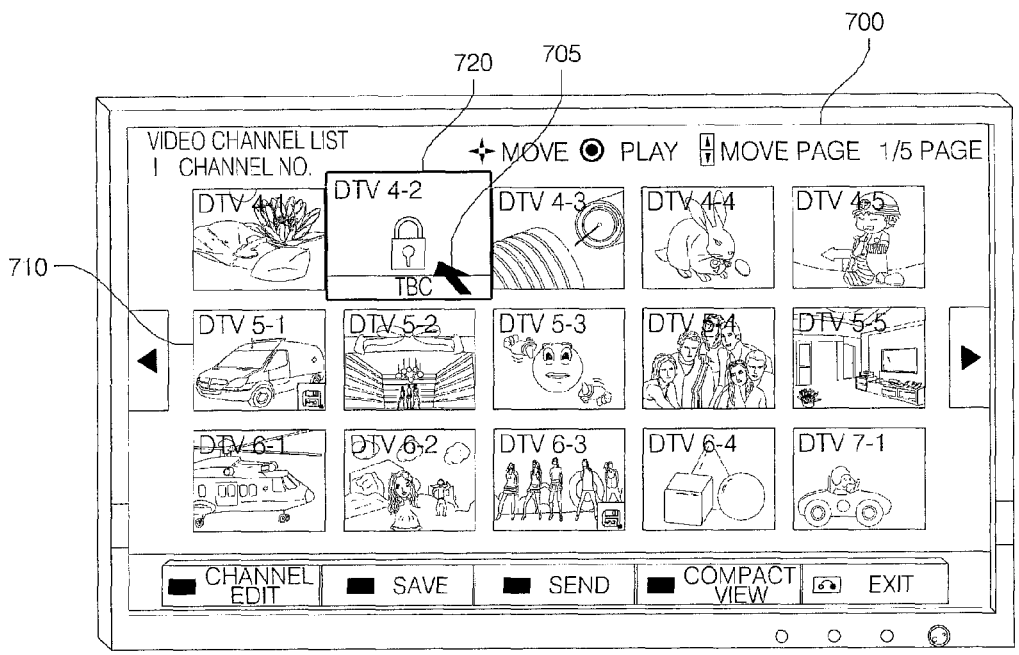
FIGS. 7A and 7B are views referred to for describing the method for operating the image display apparatus illustrated in FIG. 6.
Figure 7B:
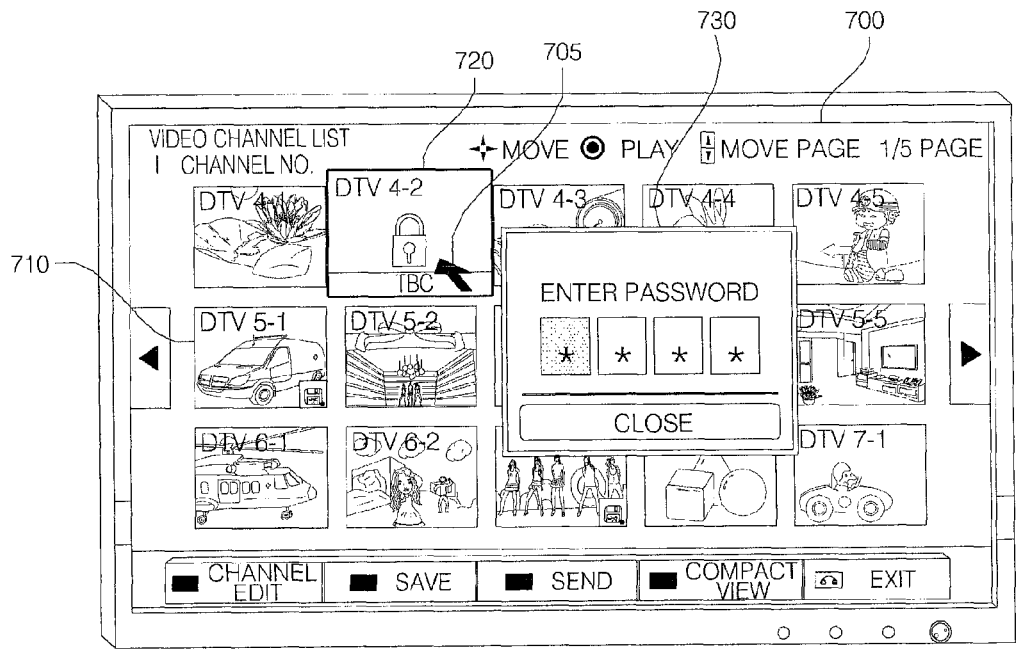

FIGS. 7A and 7B are views referred to for describing the method for operating the image display apparatus, illustrated in FIG. 6.

Referring to FIG. 7A, the user may select or focus on one of thumbnail images by moving a pointer 705 or a cursor using a remote controller, preferably a pointing device. The pointing device includes a sensor that senses motion and information about motion of the pointing device sensed by the sensor is transmitted to the image display apparatus 100. The image display apparatus 100 identifies the motion of the pointing device based on the motion information and calculates the coordinates of a target position to which the pointer 705 is to be moved in correspondence with the identified motion. Thus the pointer 705 may move to the target position corresponding to the motion of the pointing device on the display 180.

Unlike a thumbnail image 710 which has not been set as restricted, a thumbnail image 720 set as restricted may be replaced with an icon on the display 180.

Referring to FIG. 7B, if the restricted thumbnail image 720 is to be transmitted, an object 730 prompting the user to enter a password is displayed on the display 180.

The thumbnail image 720 can be transmitted or stored only if the password is valid. Since thumbnail transmission or thumbnail storing is restricted in this manner, children can be protected from sexual or violent content. Furthermore, thumbnail images may be set such that only an authorized user can process or use the thumbnail images.

As is apparent from the above description of the present invention, a user can readily identify desired content through thumbnail images and use the thumbnail images in external devices for various purposes, as well. Furthermore, the thumbnail images may be managed securely.

The image display apparatus and the operation method therefor according to the foregoing exemplary embodiments are not restricted to the exemplary embodiments set forth herein. Therefore, variations and combinations of the exemplary embodiments set forth herein may fall within the scope of the present invention.

The method for operating an image display apparatus according to the foregoing exemplary embodiments may be implemented as code that can be written to a computer-readable recording medium and can thus be read by a processor. The computer-readable recording medium may be any type of recording device in which data can be stored in a computer-readable manner. Examples of the computer-readable recording medium include a ROM, a RAM, a CD-ROM, a magnetic tape, a floppy disc, optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the embodiments herein can be construed by one of ordinary skill in the art.

While the present invention has been particularly shown and described with reference to exemplary embodiments thereof, it will be understood by those of ordinary skill in the art that various changes in form and details may be made therein without departing from the spirit and scope of the present invention as defined by the following claims.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for operating an image display apparatus, comprising:

receiving a broadcast signal;

extracting a plurality of images from the broadcast signal;

generating a plurality of thumbnail images by converting formats of the extracted images;

transmitting at least one of the thumbnail images to an external device, displaying, on a display of the image display apparatus, a thumbnail list that includes the plurality of thumbnail images; and displaying, on the display, an icon representing the external device, when the transmitted thumbnail images being stored in the external device, and wherein the icon is simultaneously displayed on the display with the thumbnail list that includes the plurality of thumbnail images, and the displayed icon representing the external device is overlaid on a corresponding thumbnail image of the plurality of the thumbnail images displayed on the display, wherein displaying the icon representing the external device includes displaying an icon representing a laptop computer.

2. The method according to claim 1, further comprising storing at least one of the generated thumbnail images.

3. The method according to claim 1, further comprising sensing the external device.

4. The method according to claim 1, further comprising converting a format of the thumbnail image transmitted to the external device based on a property of the external device.

5. The method according to claim 1, wherein generating the plurality of thumbnail images comprises generating the thumbnail images periodically or at a predetermined time.

6. The method according to claim 1, wherein when the thumbnail image transmitted to the external device relates to a restricted content, transmitting the at least one of the thumbnail images comprises transmitting the thumbnail image when a preset authentication condition is satisfied.

7. The method according to claim 1, further comprising displaying an object regarding user authentication on a display when the thumbnail image to be transmitted to the external device relates to restricted content, wherein transmitting the at least one of the thumbnail images comprises transmitting the thumbnail image after a user is authenticated.

8. The method according to claim 1, wherein when the thumbnail image relates to restricted content, displaying the at least one of the thumbnail images comprises replacing the thumbnail image with an icon and displaying the icon on the display.

9. The method according to claim 1, wherein transmitting the at least one of the thumbnail images comprises selectively transmitting the thumbnail image according to a preset condition.

10. The method according to claim 1, wherein transmitting the at least one of the thumbnail images comprises transmitting the thumbnail image corresponding to reserved content in the broadcast signal.

11. The method according to claim 1, further comprising displaying an indication of a transmission in progress or an indication of a transmission completion.

12. The method according to claim 11, wherein the indication is in text form.

13. The method according to claim 11, wherein the indication is an icon.

14. The method according to claim 1, wherein the plurality of thumbnail images are simultaneously displayed on the display, and the icon is overlaid on a first one of the plurality of thumbnail images, and a second one of the plurality of thumbnail images is displayed on the display without a corresponding icon being overlaid, on the second one of the thumbnail images.

15. An image display apparatus comprising:
a display;
a tuner for receiving a broadcast signal;
a channel browsing processor for extracting images from a received broadcast signal, and for generating a plurality of thumbnail images based on the extracted images;
a signal input/output unit to interface with an external device; and
a controller for controlling transmission of at least one of the thumbnail images to the external device,
wherein the controller controls to display, on the display, a thumbnail list that includes the thumbnail images and to display, on the display, an icon representing the external device, when the transmitted thumbnail images being stored in the external device, and
wherein the icon is simultaneously displayed on the display with the thumbnail list that includes the plurality of thumbnail images, and the displayed icon representing the external image is overlaid on a corresponding thumbnail image of the plurality of the thumbnail images displayed on the display,
wherein the controller controls to display the icon representing the external device includes the controller controls to display, on the display, an icon representing a laptop computer.

16. The image display apparatus according to claim 15, wherein the channel browsing processor comprises:
a decoder for extracting the images from the received broadcast signal; and
a format converter for generating the thumbnail images by converting formats of the extracted images.

17. The image display apparatus according to claim 15, further comprising a storage for storing the generated thumbnail images.

18. The image display apparatus according to claim 15, wherein when a thumbnail image relates to restricted content, the controller controls replacement of the thumbnail image with an icon on the display.

19. The image display apparatus according to claim 15, wherein when the thumbnail image transmitted to the external device relates to restricted content, the controller controls transmission of the thumbnail image to occur when a preset authentication condition is satisfied.

20. The image display apparatus according to claim 15, wherein when the thumbnail image transmitted to the connected external device relates to restricted content, the controller displays an object regarding user authentication on the display and controls transmission of the thumbnail image, once a user is authenticated.

21. The image display apparatus according to claim 15, wherein the controller displays a transmission state by displaying an indication of a transmission in progress or an indication of a transmission completion.

22. The image display apparatus according to claim 21, wherein the indication is in text form.

23. The image display apparatus according to claim 21, wherein the indication is an icon.

* * * * *